United States Patent [19]

Futami et al.

[11] Patent Number: 5,087,225
[45] Date of Patent: Feb. 11, 1992

[54] OIL TENSIONER WITH BELL-SHAPED OIL FILTER

[75] Inventors: Yuichi Futami, Iruma; Masao Murano, Hidaka; Shigeru Okamura, Zushi, all of Japan

[73] Assignees: Tsubakimoto Chain Co., Osaka; Nissan Motor Co., Yokohama, both of Japan

[21] Appl. No.: 609,514

[22] Filed: Nov. 6, 1990

[51] Int. Cl.⁵ .................................................. F16H 57/04
[52] U.S. Cl. ........................................ 474/91; 474/110
[58] Field of Search ............... 474/91, 92, 110, 135, 474/136, 138

[56] References Cited

U.S. PATENT DOCUMENTS 4,190,025  2/1980  Wahl .............................. 474/110 X Primary Examiner—Ramon S. Britts
Assistant Examiner—Roger J. Schoeppel
Attorney, Agent, or Firm—Howson & Howson

[57] ABSTRACT

An oil tensioner for applying a tensile force to chains, belts and similar wrapping type power transmitting mechanisms. The tensioner includes an oil reservoir for storing oil drawn from an engine block to a cylinder of a piston via a check valve, and returned to the reservoir via an orifice. The valve and orifice allow the piston to move more readily in one direction than in the other. A bell-shaped oil filter disposed adjacent to the bottom of the reservoir filters out chips and dust as well as controls the rate of oil outflow thereby preventing air from being drawn into the cylinder with the oil, and providing smooth oil flow and possible damage to the components.

7 Claims, 8 Drawing Sheets

PRIOR ART

OIL TENSIONER WITH BELL-SHAPED OIL FILTER

BRIEF SUMMARY OF THE INVENTION

This invention relates generally to tensioners, and in particular to an oil tensioner suitable for applying tension to power transmission chains, belts and the like used, for example, for operating the camshaft of an automobile engine.

A conventional oil tensioner typically applies a fixed tension through a piston to a chain or belt to prevent skipping or slipping, respectively.

The oil tensioner has an oil reservoir for storing oil fed from an engine block. When the piston moves in one direction, oil is drawn into the cylinder of the piston from the oil reservoir by way of a check valve mechanism; but when the piston moves in the opposite direction, oil is returned through an orifice to the oil reservoir. The oil tensioner thereby allows movement of the piston readily in the one direction, but resists movement of the piston in the opposite direction to eliminate any possibility of slack in the chain, belt or the like.

Oil tensioners of the type above-described, however, have numerous drawbacks. In particular, chips, dust and similar foreign substances inadvertently left in an engine block during production of an engine may sometimes be admitted into the oil tensioner together with oil when the engine is started for the first time. Accumulation of these substances in the tensioner oil passages, check valve mechanisms and so forth can obstruct smooth flow of the oil or cause damage to the piston and/or cylinder of the oil tensioner thereby interfering with movement of the piston.

Furthermore, the amount of oil in the oil reservoir may be reduced while the engine is not running due to leakage from between the piston and the cylinder of the oil tensioner to the outside. (Oil tensioners are typically designed so they leak at a low rate.) If, under such reduced oil conditions, the starter motor is operated, but the engine is not started successfully, the piston of the oil tensioner may move in a direction to draw oil into the cylinder, but oil will not be fed from the engine block promptly. The oil reservoir may then become empty and air may be drawn into the cylinder. If this occurs, the piston can be easily pushed back by a comparatively weak force exerted by the chain. Under these conditions, smooth movement of the chain is not assured.

Even under low oil conditions, when there is some residual oil in the reservoir, air may be sucked into the cylinder. Since the piston is normally urged in the tightening direction by a spring, it moves at high speed. A bell-like recess is formed in the surface of the residual oil in the reservoir, and air is drawn rapidly into the cylinder together with air.

Accordingly, an object of the present invention is to provide an oil tensioner wherein foreign substances such as chips and dust in oil carried from an engine block are effectively removed to permit smooth flow of the oil and to prevent inadvertent possible damage to components of the oil tensioner.

Another object of the present invention is to provide an oil tensioner for effectively preventing the suction of air together with oil into the cylinder of the piston.

In order to attain these and other objects, according to the present invention, there is provided an oil tensioner of the type wherein oil is fed from an engine block and first stored in an oil reservoir. The oil is drawn into the cylinder of the tensioner from the oil reservoir via a check valve mechanism when the piston moves in one direction. When the piston moves in the opposite direction, the oil is returned to the oil reservoir via an orifice. The piston does not return as rapidly as it moves in the one direction, and consequently, it eliminates slack in the chain, belt or the like.

The oil tensioner further comprises an oil filter in the oil reservoir. When oil flows from the oil reservoir to the cylinder, it must pass through the oil filter. Foreign substances such as chips and dust, which have been carried into the oil reservoir from the engine block, are removed and do not enter into the check valve mechanism, or into the clearance between the piston and cylinder, or into the orifice. Consequently, the flow of oil and movement of the piston are smooth, and the piston and cylinder remain undamaged.

Further, since the oil filter provides flow resistance to oil, and the oil may be drawn quickly into the cylinder with rapid movement of the piston in the one direction, the flow rate of the oil is controlled to prevent the surface of residual oil in the reservoir from assuming a bell-like recessed shape which may allow air to be drawn into the cylinder together with the oil.

Preferably, the oil filter has a section of a bell-like recessed shape and is provided at or in the proximity of a bottom portion of the oil reservoir. Thus, the oil flow rate can be controlled and suction of air can be completely prevented as oil flows from the oil reservoir.

The above and other objects, features and advantages of the invention will become apparent from the following description and the appended claims, taken in conjunction with the accompanying drawings.

DETAILED DESCRIPTION

Figure 1:
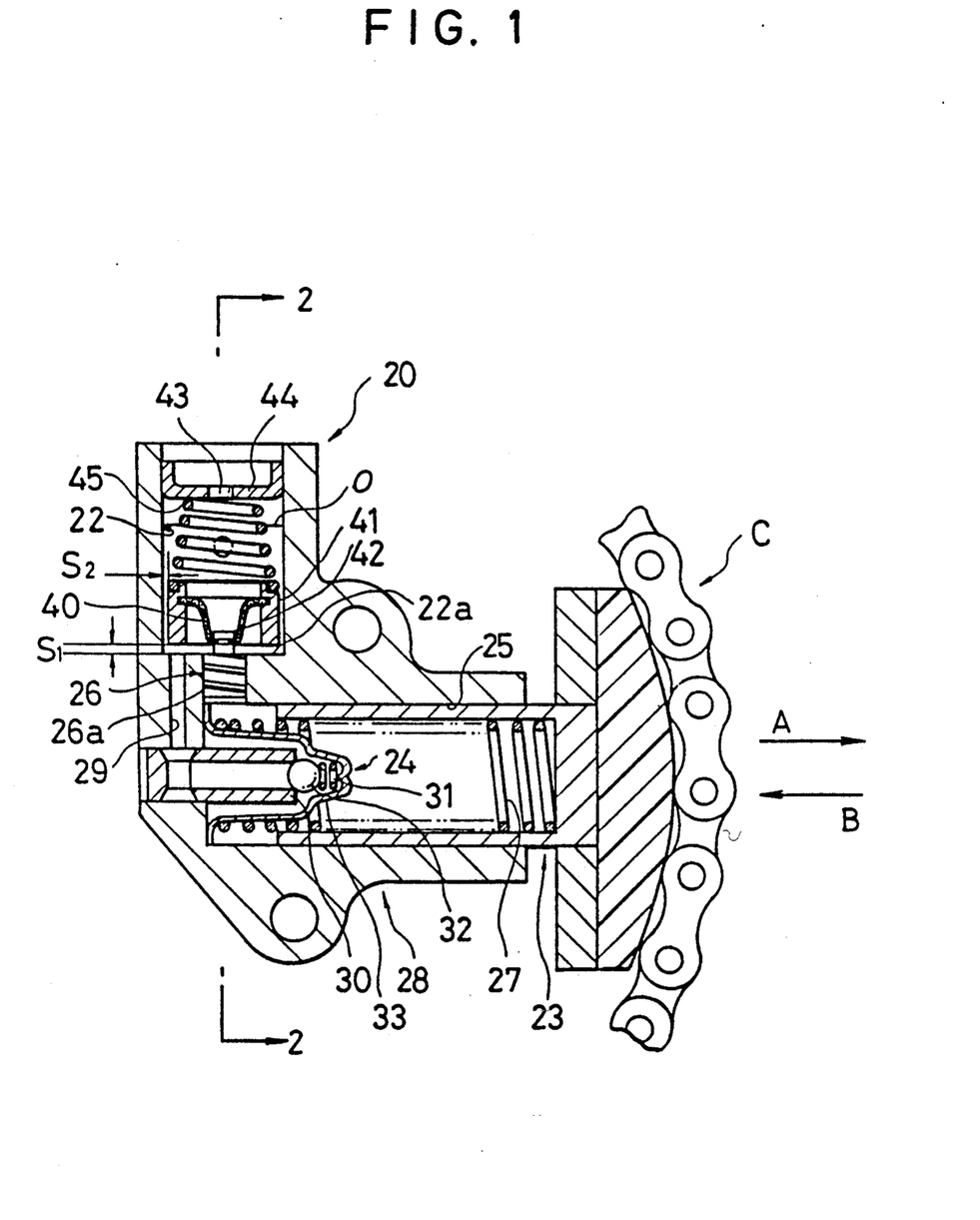
FIG. 1 is a vertical section of one preferred embodiment of an oil tensioner with an oil filter according to the present invention.
Figure 2:
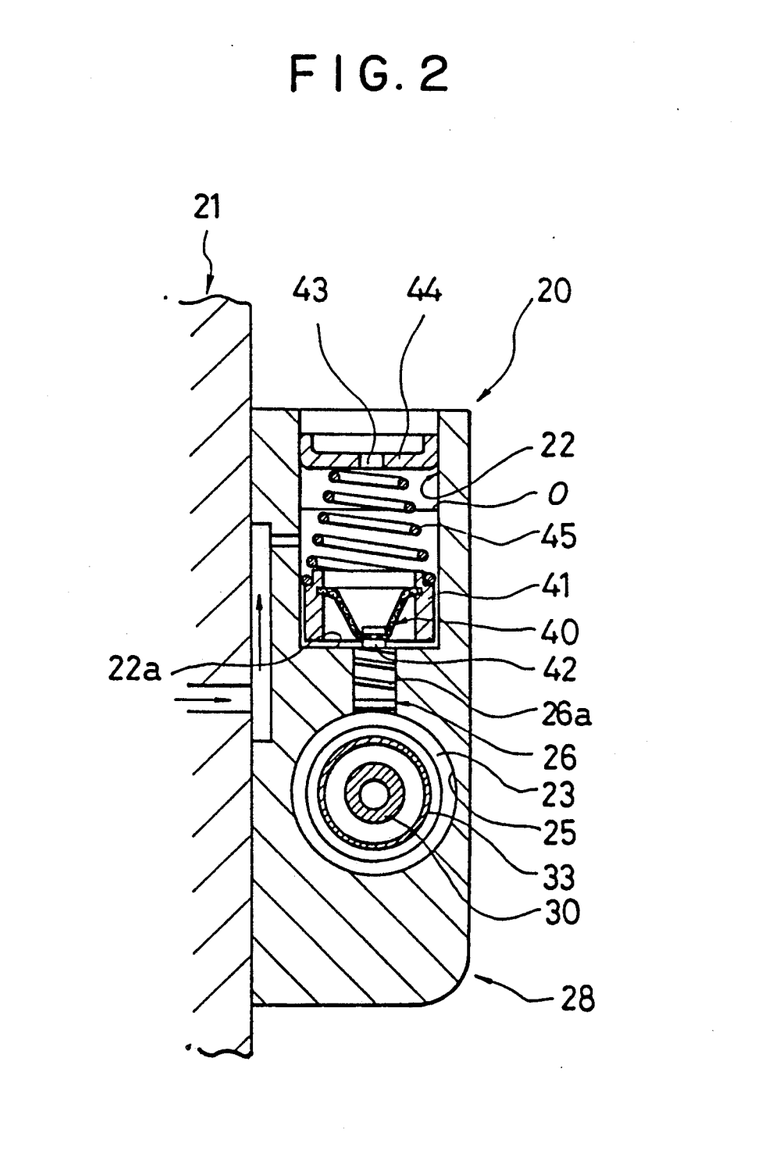
FIG. 2 is a section of the oil tensioner taken on plane 2—2 of FIG. 1.

Referring now to the drawings wherein like characters designate like or corresponding parts throughout the several views, there is shown in FIGS. 1 and 2 an oil tensioner, generally denoted at 20, with an oil filter according to a first preferred embodiment of the present invention. The tensioner 20 has a function of applying a fixed tension, for example to a chain C for driving the camshaft (not shown) of an automobile engine. Tensioner 20 is mounted on the wall of an engine block 21 and operatively constructed to feed oil 0 from the engine block 21 to an oil reservoir 22. A piston 23 moving in one direction upon occurrence of a slack in chain C, draws oil 0 into a cylinder 25 by way of a check valve mechanism 24; but when the piston 23 moves in the opposite direction, the oil is returned to the oil reservoir 22 through an orifice 26. Thus, piston 23 may move readily in the one direction as indicated by arrow A in FIG. 1, but may not move back as readily in the opposite direction of arrow B, thereby avoiding any possible slack in chain C. The piston 23 is normally urged in the direction of arrow A by a spring 27.

Orifice 26 is defined by cylindrical shaft having a helical groove 26a on the outer periphery forming a narrow or fine oil passage. Check valve mechanism 24 includes a tubular seat 30 force-fitted in a housing 28 and communicating with an oil path 29, a ball 32 normally held in resilient contact with seat 30 under the resilient force of a spring 31, and a retainer 33 for retaining the spring 31 and the ball 32 in position. The structure of the oil tensioner 20, as described above, is substantially the same as that of most conventional oil tensioners.

Figure 3:
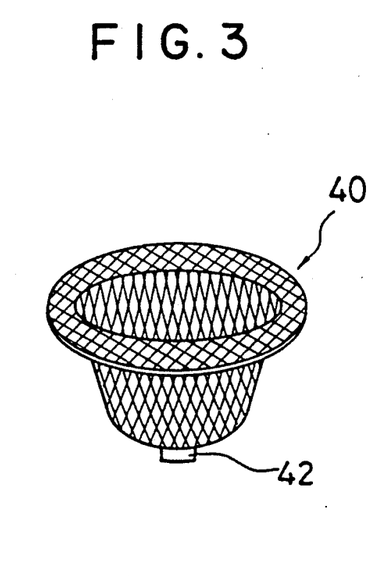
FIG. 3 is a perspective view of the oil filter of FIG. 1.

An oil filter 40 is provided at a bottom portion 22a of oil reservoir 22. As shown in FIG. 3, filter 40 is formed from a small-mesh wire gauze of bell-like recessed shape in cross section, and is mounted in a tubular oil filter body 41. The sectional shape of the oil filter 40 conforms to the shape of the surface of the oil 0 when the oil 0 remaining by a small amount in the oil reservoir 22 is drawn into the oil path 29. A support member 42 extends from the bottom of filter 40 for supporting filter 40 on the orifice 26 with a gap $S_1$ between the filter body 41 and bottom portion 22a.

The oil filter 40 is pressed against the orifice 26 by a spring 45 interposed between the oil filter body 41 and a plug 44 which has an air hole 43 formed therein and which is force-fitted fitted in the oil reservoir 22. A gap $S_2$ of dimension corresponding in magnitude to a "sieve opening" of filter 40 is provided between the inner wall of the oil reservoir 22 and the outer wall of the filter body 41.

Figure 4:
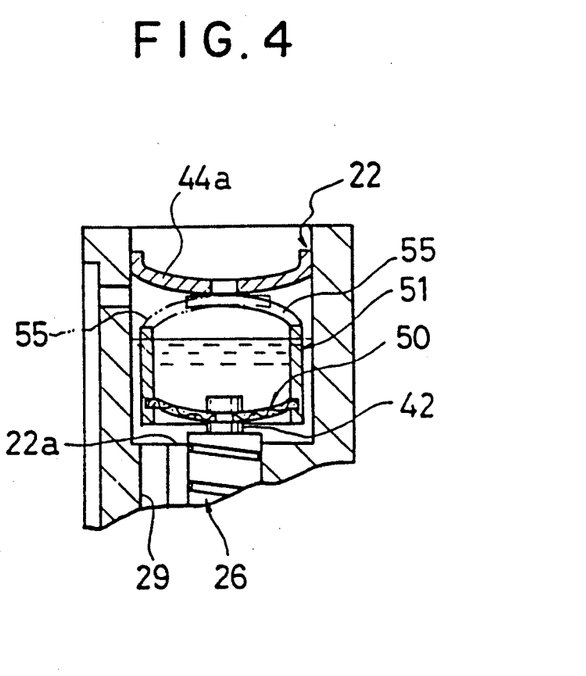
FIG. 4 is a partial sectional view of a second embodiment of an oil tensioner with an oil filter according to the invention.
Figure 5:
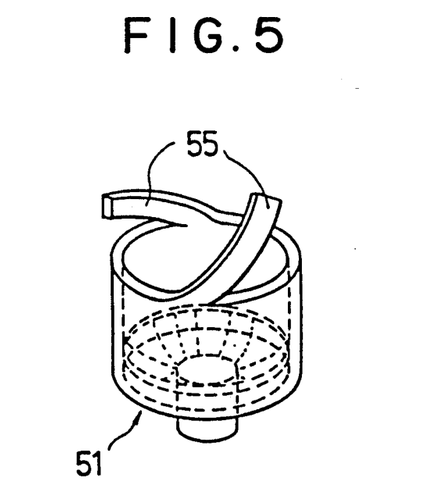
FIG. 5 is a perspective view of the oil filter of FIG. 4.

As shown in FIGS. 4 and 5, filter 40 and spring 45 of FIG. 1 are replaced by a pair of resilient tongues 55 formed integrally on an oil filter 50 and filter body 51 of, for example, a resin material. The alternate embodiment shown in FIGS. 4 and 5 is thereby simplified in structure compared to oil tensioner 20 of FIGS. 1 and 2.

Figure 6:
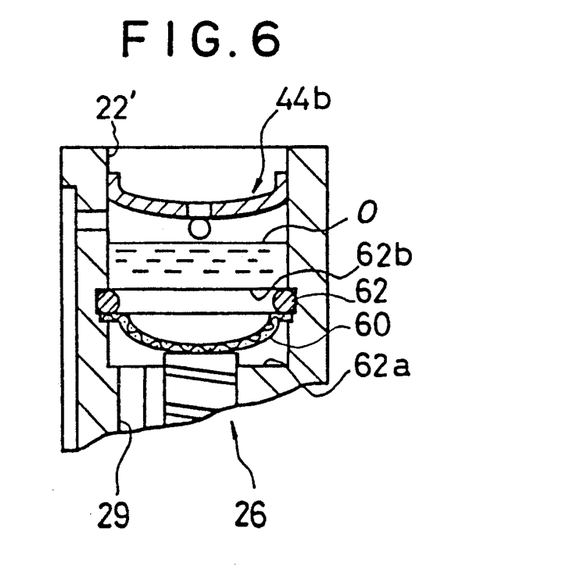
FIG. 6 is a partial sectional view of a third embodiment of an oil tensioner with an oil filter according to the invention.
Figure 7:
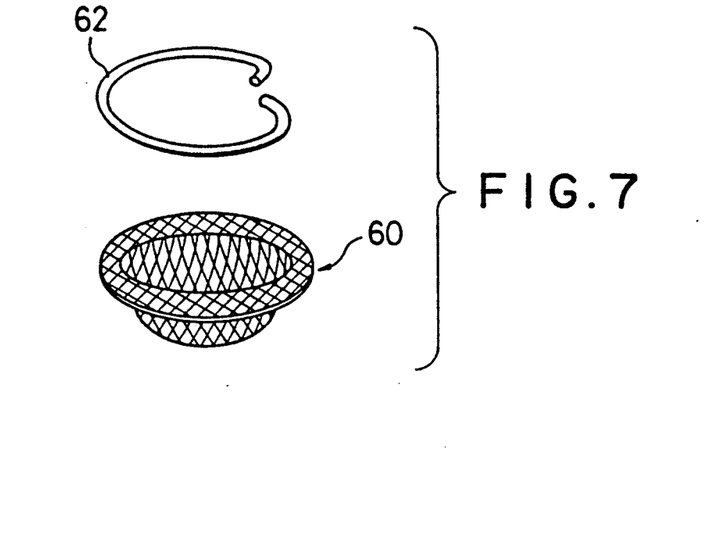
FIG. 7 is an exploded perspective view of the oil filter of FIG. 6.

Referring to FIGS. 6 and 7, oil filter 40 of FIG. 1 may also be replaced by an oil filter 60 between the orifice 26 and a C-shaped spring 62 retained in a groove 62b which is formed on the inner wall of an oil reservoir 22'. The oil tensioner thus modified is a further simplification in structure.

Figure 8:
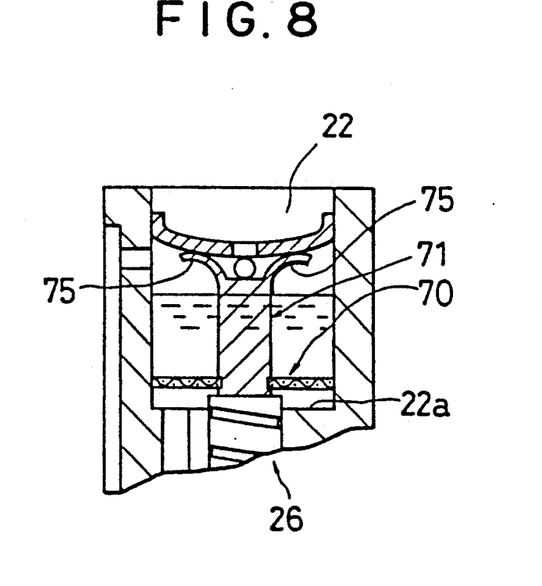
FIG. 8 is a partial sectional view of a fourth embodiment of an oil tensioner with an oil filter according to the invention.
Figure 9:
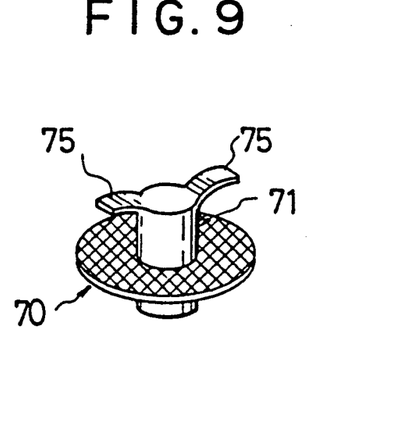
FIG. 9 is a perspective view of the oil filter of FIG. 8.

While the filters 40, 50 and 60 have a generally bell-like recessed cross section, a flat filter 70, as shown in FIGS. 8 and 9, is also contemplated. The filter 70 is fitted on a shaft 71 having a pair of resilient tongues 75 formed thereon so that filter 70 may be adjusted in position.

Where such oil filter 40, 50, 60 or 70 is provided at the bottom portion of the oil reservoir 22 or 22' as described above, the following advantages can be anticipated.

First, with particular reference to FIGS. 1 and 2, since oil fed from the engine block 21 is first filtered by the oil filter 40 and then admitted into the cylinder 25, foreign substances such as chips and dust are removed and do not enter between the seat 30 and the ball 32, between the piston 23 and the cylinder 25, into groove 26a of the orifice 26, or into similar components. Accordingly, oil flow is smooth, piston 23 and cylinder 25 are prevented from being damaged, smooth movement of the piston 23 is assured, and normally fixed tension can be applied to the chain C.

Figure 13:
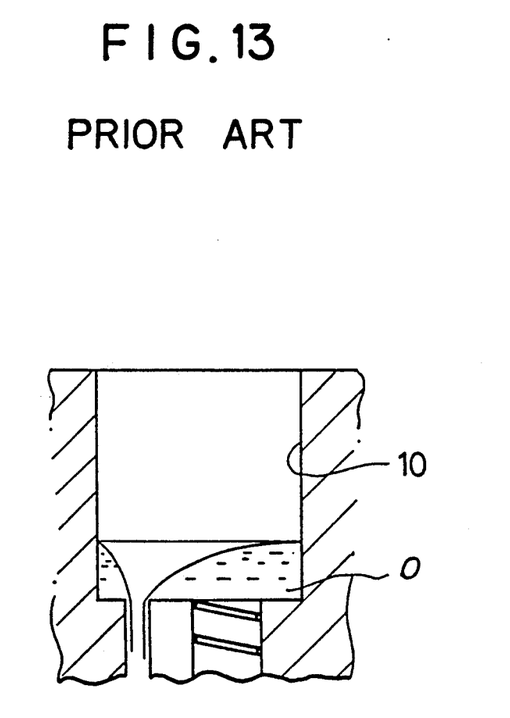
FIG. 13 is a sectional view of an oil reservoir of a prior art oil tensioner.

Secondly, since the oil filter 40 applies flow resistance to the oil, the oil flow rate caused by quick movement of the piston 23 in the direction of arrow A is controlled. FIG. 13 shows the bell-like recessed surface profile of oil 0 formed in an oil reservoir 10 of conventional design when the oil is drawn out the bottom. According to the invention, however, the surface of the oil is prevented from assuming the bell-like recessed shape, and suction of air into cylinder 25 together with oil is prevented. As a result, the piston will not be pushed back by a weak force exerted by chain C, and a normally fixed tension is applied.

Thirdly, where the oil filter 40 is shaped with a cross section of a bell-like recessed profile, the oil flow rate of oil can be controlled and suction of air together with oil can be prevented until oil is depleted.

Figure 10:
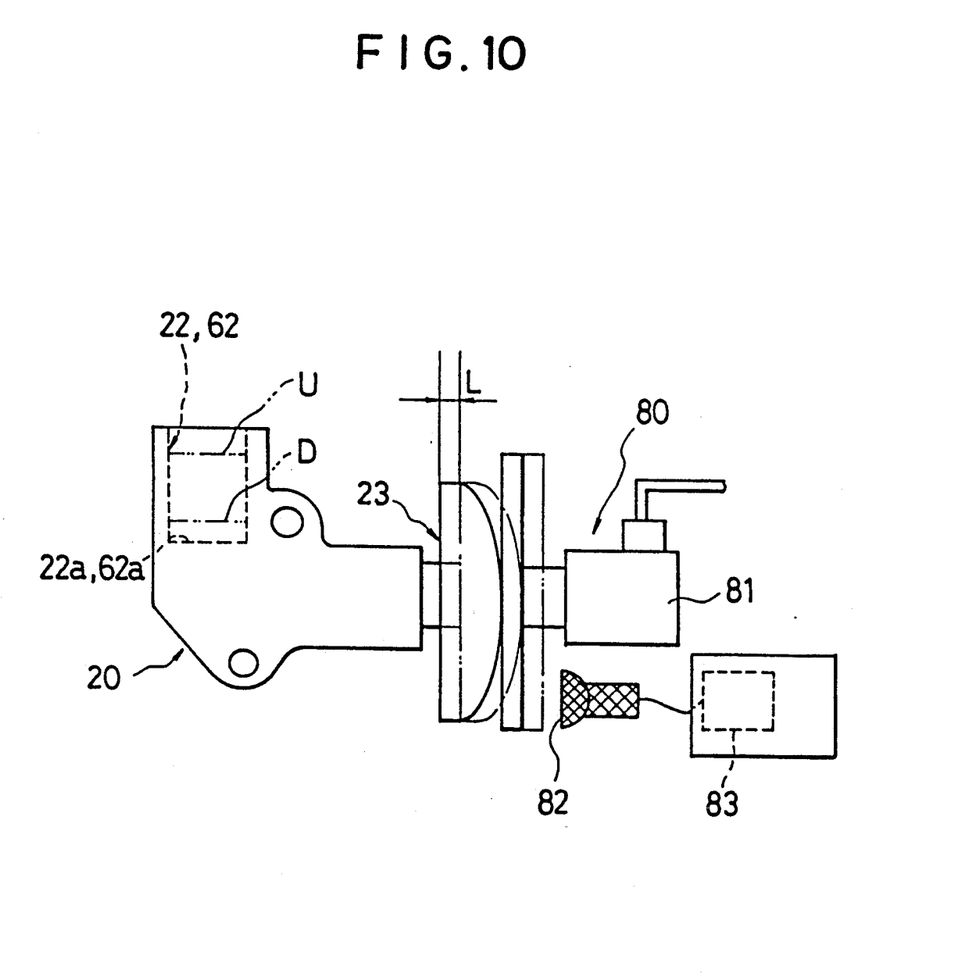
FIG. 10 is a schematic view of a testing apparatus.
Figure 11:
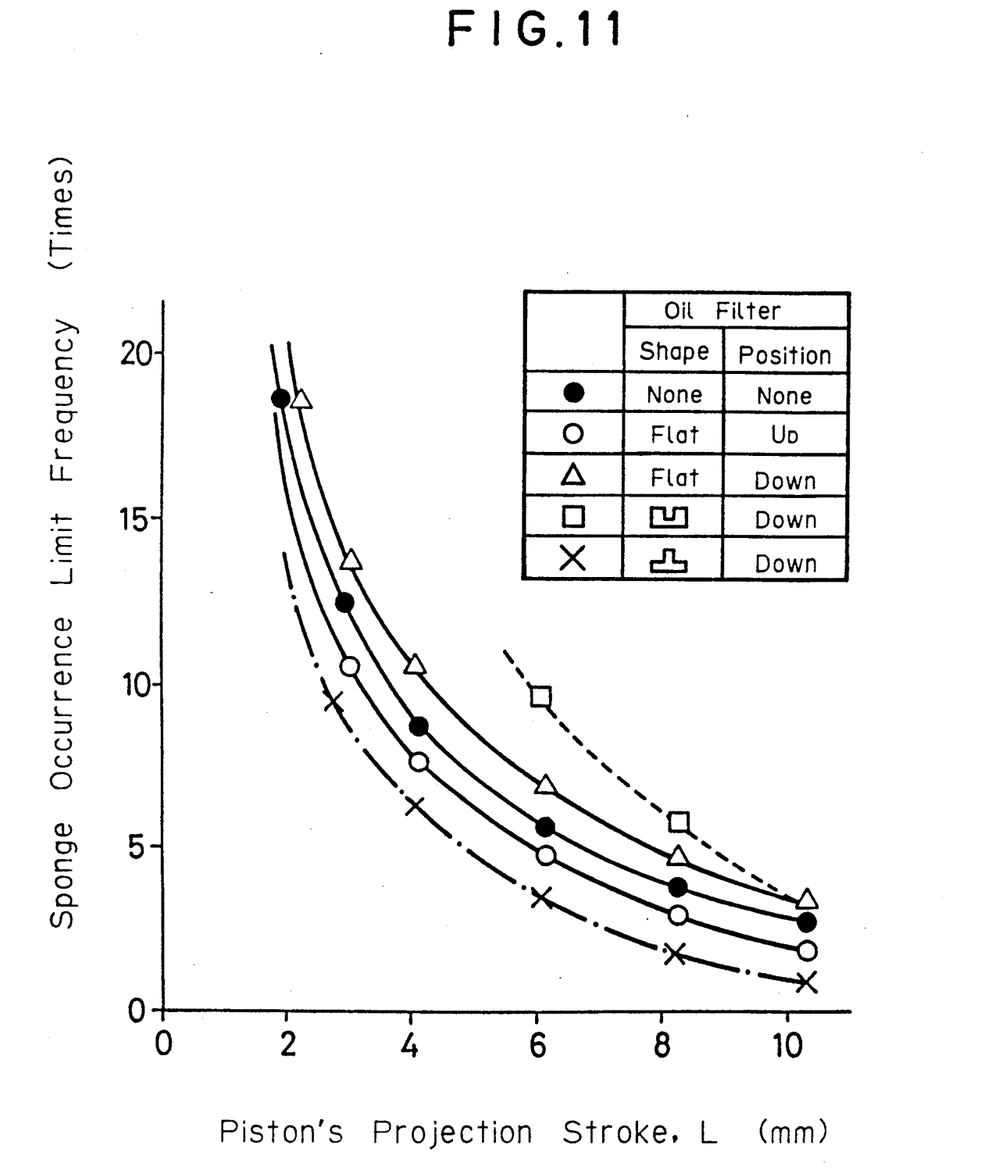
FIGS. 11 and 12 are graphs showing data obtained by a test conducted using the testing apparatus of FIG. 10.

The second and third advantages are demonstrated by the test results illustrated in the graphs of FIG. 11 derived from tests using the testing apparatus of FIG. 10.

Figure 12:
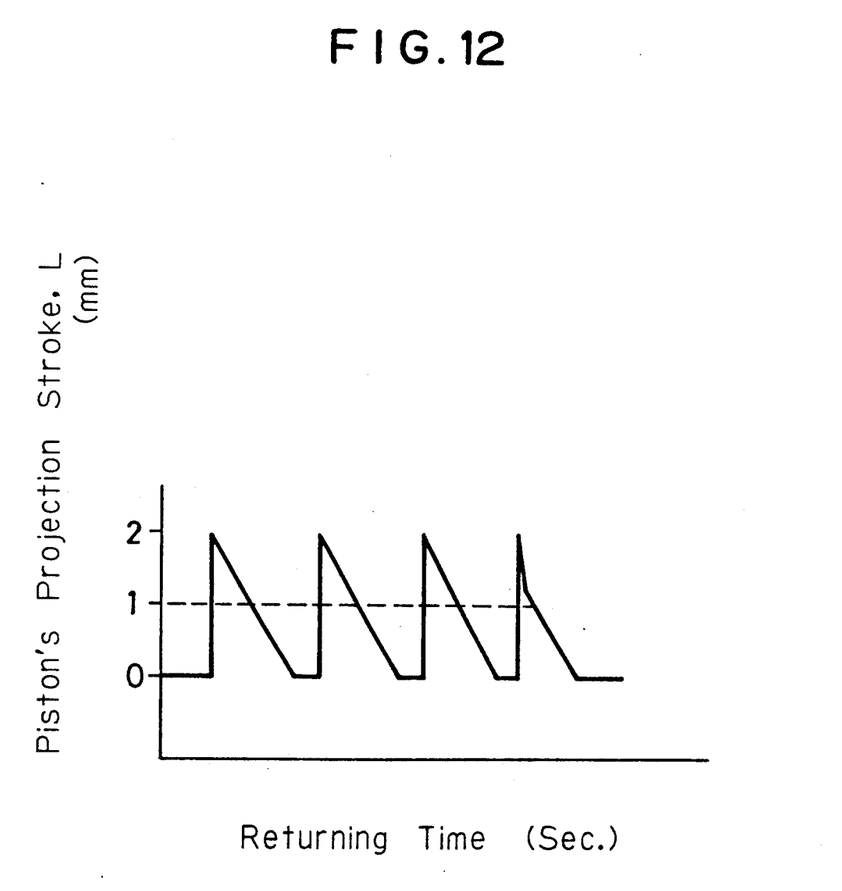

The tests were conducted to check the presence or absence of the suction of air together with oil depending upon whether or not an oil filter is mounted in the oil reservoir, and in the case where an oil filter is mounted, depending upon the position of the oil filter in the reservoir. Generally, since air is highly compressible compared to oil, the return speed of the piston 23 will increase when air is admitted to cylinder 25. Therefore, the tests involved detecting the return speed of piston 23 to determining the admission of air into the cylinder 25. As illustrated in FIG. 10, piston 23 is projected by the spring 31 until stopped by an air cylinder 81 for a predetermined stroke L. Air cylinder 81 then pushes piston 23 back to its initial position. This is repeated several times while a relationship between the position of piston 23 and the time required for such returning movement is observed by a gap sensor 82 and analyzer 83 to obtain a graph such as shown in FIG. 12. The number of projections occurring until the piston 23 returns substantially to one half of the stroke L, or so-called sponge occurrence limit frequency, is thus determined.

FIG. 12 shows data obtained with the projection stroke L set at 2 mm. The returning time to a position of about 1 mm (one half of stroke L) is reduced almost to zero upon the fourth returning movement. Accordingly, the sponge occurrence limit frequency in this instance is four (4). The test was repeated for different strokes L of the piston with filters of various shapes mounted at various positions. The results are indicated in graphs in FIG. 11.

In FIG. 11, characters "●" plot a graph of the tests wherein no filter was used; characters "○" plot a graph wherein flat-shaped filter 70 was mounted in the upper position U in the oil reservoir 22 of FIG. 10; characters "Δ" plot a graph wherein filter 70 was mounted in the lower position D of FIG. 10; characters "□" plot a graph wherein filter 40 of bell-like recessed section was mounted at the lower position shown in FIGS. 1 and 2; and characters "x" plot a graph wherein filter 40 was mounted upside down at the lower position in the oil reservoir 22.

The graphs of FIG. 11 show that the probability of admission of air into the cylinder 25 is lowest where the bell-like recessed shape filter 40 or flat shape filter 70 is mounted at the lower portion 22a or 62a of the oil reservoir 22 or 62, respectively.

The invention having now been fully described, it will be apparent to one of ordinary skill in the art that many changes and modifications can be made without departing from the spirit and scope of the invention as set forth in the following claims.

We claim:

1. In an oil tensioner wherein oil fed from an engine block is first stored into an oil reservoir having a bottom opening, and is sucked through said bottom opening into a cylinder from said oil reservoir by way of a check valve mechanism when a piston within the cylinder moves in one direction, and the oil is returned into said oil reservoir by way of an orifice when said piston moves in the opposite direction, said piston moving more rapidly in said one direction than in the opposite direction to eliminate a possible slack of a chain, belt or the like, the improvement comprising an oil filter located within said oil reservoir in proximity to said bottom opening, said oil filter having an inverted bell-like cross-sectional shape, whereby rapid motion of the piston in said one direction causes flow of oil from said reservoir through said bottom opening without setting up a recess in the surface of the oil in the reservoir which allows air to flow from above the oil in said reservoir into the cylinder through said bottom opening of the reservoir.

2. In an oil tensioner for maintaining tension in a driving chain, belt or the like, said tensioner having an oil reservoir for storing oil fed from an engine block, said oil reservoir having a bottom surface, a cylinder, a piston slidable in said cylinder, said piston and cylinder forming an expansible chamber, means connected to said piston for applying tension to the driving chain, belt or the like, the tension increasing as said piston moves in one direction to expand said chamber, passage means providing communication between said expansible chamber and said reservoir through said bottom surface thereof, said passage means having means providing a check valve mechanism openable to allow rapid flow of oil from said reservoir to said expansible chamber when said piston moves in said one direction, and said passage means also including means providing an orifice for return flow of oil from said chamber to said reservoir when the piston moves in the opposite direction, whereby the piston moves more readily in said one direction than in the opposite direction, and oil filter means within said reservoir for preventing particles in the oil in said reservoir from flowing through said passage means to said expansible chamber, the improvement wherein:

said oil filter means is disposed at the bottom of said reservoir and has an inverted bell-like shape;

whereby rapid motion of the piston in said one direction causes flow of oil from said reservoir through said passage means without setting up a recess in the surface of the oil in the reservoir which allows air from above the oil in said reservoir to be drawn together with said oil into said expansible chamber.

3. An improvement according to claim 2 wherein said oil filter means further comprises:

a plug secured to said reservoir within the top portion thereof; and a hollow cylindrical body slidably disposed within said reservoir below said plug and having an interior surface;

in which said oil filter means comprises an inverted bell-shaped gauze element coaxially mounted to the interior surface of said cylindrical body; and further comprising spring means disposed between said plug and said cylindrical body for urging said cylindrical body downward.

4. An improvement according to claim 3 wherein said oil filter means includes means providing a support member extending from the bottom portion of said inverted bell-shaped gauze element for providing a gap between said cylindrical body and said bottom surface of said reservoir.

5. An improvement according to claim 3 wherein said cylindrical body and said reservoir have cylindrical facing surfaces with a gap between them having a dimension approximately equal to the size of the sieve openings of said gauze element.

6. An improvement according to claim 2 wherein said oil filter means further comprises:

a plug secured to said reservoir within the top portion thereof; and a hollow cylindrical body slidable within said reservoir below said plug;

in which said oil filter means comprises an inverted bell-shaped small-mesh gauze element coaxially mounted to the interior of said hollow cylindrical body; and further comprising means providing resilient tongues formed integrally on said cylindrical body and pressing against said plug, thereby urging said cylindrical body downward.

7. An improvement according to claim 2 wherein said oil filter means further comprises:

a C-shaped spring operatively connected to a wall of said reservoir above the bottom portion thereof; and a small-mesh, inverted bell-shaped gauze element coaxially disposed in the interior of said reservoir and having an outer edge in engagement with said C-shaped spring.

* * * * *